(12) United States Patent
Cress

(10) Patent No.: US 11,994,058 B2
(45) Date of Patent: May 28, 2024

(54) IGNITION CHARGE FORMATION STABILIZATION IN GASEOUS FUEL ENGINE SYSTEM

(71) Applicant: Caterpillar Inc., Peoria, IL (US)

(72) Inventor: James Jay Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 17/673,517

(22) Filed: Feb. 16, 2022

(65) Prior Publication Data

US 2023/0258119 A1    Aug. 17, 2023

(51) Int. Cl.
| | | |
|---|---|---|
| *F02B 19/12* | (2006.01) | |
| *F02B 19/10* | (2006.01) | |
| *F02B 19/18* | (2006.01) | |
| *F02M 21/02* | (2006.01) | |

(52) U.S. Cl.
CPC .......... *F02B 19/12* (2013.01); *F02B 19/1019* (2013.01); *F02B 19/18* (2013.01); *F02M 21/0209* (2013.01); *F02M 21/0218* (2013.01)

(58) Field of Classification Search
CPC ...... F02B 19/12; F02B 19/1019; F02B 19/18; F02M 21/0209
See application file for complete search history.

(56) References Cited

U.S. PATENT DOCUMENTS

| | | | |
|---|---|---|---|
| 2,970,581 A * | 2/1961 | Georges | .................. F02D 15/04 |
| | | | 123/286 |
| 4,987,868 A | 1/1991 | Richardson et al. | |
| 6,213,085 B1 * | 4/2001 | Durling | .................. H01T 13/50 |
| | | | 123/266 |
| 9,353,674 B2 | 5/2016 | Bunce et al. | |
| 10,612,454 B2 | 4/2020 | Bedogni et al. | |
| 2005/0000484 A1 | 1/2005 | Schultz et al. | |
| 2014/0360468 A1 * | 12/2014 | Fedin | ................. F02M 21/0209 |
| | | | 123/445 |
| 2016/0053670 A1 * | 2/2016 | Tozzi | ..................... F02P 13/00 |
| | | | 123/260 |

FOREIGN PATENT DOCUMENTS

EP     2998537 A1    3/2016

* cited by examiner

*Primary Examiner* — Xiao En Mo
(74) *Attorney, Agent, or Firm* — Brannon Sowers & Cracraft PC

(57) ABSTRACT

Operating a gaseous fuel engine system includes urging a mixture containing a gaseous hydrogen fuel and air into a pocket in an igniter fluidly connected to a cylinder to form an ignition charge, and igniting the ignition charge via a flame kernel formed by energizing spark electrodes of the igniter. The method further includes igniting a main charge containing the gaseous hydrogen fuel via a flame jet of the ignition charge from the igniter. The pocket is shielded from the cylinder sufficiently to form within the pocket a flow field protecting the flame kernel, while fluidly connected to the cylinder sufficiently to clear the pocket of residual combustion gases.

19 Claims, 6 Drawing Sheets

IGNITION CHARGE FORMATION STABILIZATION IN GASEOUS FUEL ENGINE SYSTEM

TECHNICAL FIELD

The present disclosure relates generally to operating a gaseous fuel engine system, and more particularly to balancing protection of a flame kernel within an igniter from extinguishment with clearing residual combustion gases from the igniter.

BACKGROUND

Gaseous fuel engines are well known and widely used throughout the world for diverse purposes ranging from vehicle propulsion to production of electrical power and operation of equipment such as pumps and compressors. In a typical gaseous fuel engine configuration a feed of a gaseous fuel such as natural gas, methane, or others is supplied into cylinders in the engine and sparkplugs are used to ignite the charge within the cylinders and drive reciprocating pistons.

Various modifications and alternative configurations to the above general configurations have seen commercial success over the years including dual fuel engines employing a small pilot charge of a liquid fuel that is compression-ignited to ignite a larger main charge. Some gaseous fuel engines employ an enriched prechamber ignition device where a relatively small ignition charge is produced from a direct feed of a pilot fuel into a prechamber where it is spark-ignited to produce combusting flame jets that exit the device to ignite a main charge in a cylinder. Prechamber sparkplugs are also well known and widely used where a non-enriched sparkplug prechamber encapsulating spark electrodes is supplied with fuel and air for producing an ignition charge directly from the cylinder. One known prechamber spark-ignition device is set forth in European Patent No. EP2998537A1, and proposes a prechamber assembly including a main prechamber and an auxiliary prechamber body. For combusting lean fuel mixtures the prechamber assembly apparently facilitates a high ignitability while generating a small amount of oxides of nitrogen.

While the above general technologies have worked well for many years, more recently increased attention and engineering effort has focused on exploiting alternative fuels, particularly gaseous hydrogen fuel. Gaseous hydrogen fuel offers advantages respecting certain emissions over known technologies but is associated with a variety of newer challenges. Gaseous hydrogen fuel tends to burn at a significantly higher flame speed than hydrocarbon gaseous fuels potentially impacting efforts at precise ignition timing and combustion phasing. Hydrogen can also require different handling and storage equipment than what is conventionally available, and require a relatively large gas throughput through an engine to burn sufficient fuel to satisfy power demands. Other challenges relating to using gaseous hydrogen fuel in reciprocating engines are known and still emerging.

SUMMARY

In one aspect, a method of operating a gaseous fuel engine system includes reciprocating a piston in a cylinder in an engine between a bottom-dead-center position and a top-dead-center position, and urging a mixture containing a gaseous hydrogen fuel and air from the cylinder into a pocket in an igniter during a compression stroke of the piston to form an ignition charge within the pocket. The method further includes igniting the ignition charge via a flame kernel formed by energizing spark electrodes of the igniter, and igniting a main charge containing the gaseous hydrogen fuel in the cylinder via a flame jet of the ignition charge from the igniter. The method further includes shielding the pocket from the cylinder sufficiently to form within the pocket a flow field protecting the flame kernel from extinguishment, and fluidly connecting the pocket to the cylinder sufficiently to clear the pocket of residual combustion gases in advance of the forming of the ignition charge.

In another aspect, a method of stabilizing ignition charge formation in a gaseous fuel engine system includes producing a flame kernel within a pocket in an igniter in a gaseous fuel engine via a spark, and shielding the pocket from a flow of gases in a cylinder fluidly connected to the pocket to inhibit extinguishment of the flame kernel. The method further includes igniting an ignition charge containing gaseous hydrogen fuel and air within the pocket via the flame kernel, and exchanging gases between the pocket and the cylinder in advance of producing the flame kernel to clear the pocket of residual combustion gases. The method further includes limiting combustion phasing errors in the gaseous fuel engine system based on the exchanging gases between the pocket and the cylinder.

In still another aspect, a gaseous fuel engine system includes an engine housing having a cylinder formed therein, and a piston reciprocable in the cylinder between a top-dead-center position and a bottom-dead-center position. The gaseous fuel engine system further includes a gaseous hydrogen fuel supply, an intake system connecting between the gaseous hydrogen fuel supply and the cylinder, and an igniter having a pocket formed therein, spark electrodes forming a spark gap within the pocket, and a shielding wall. The shielding wall extends around the pocket and shields the pocket from gas flow in the cylinder sufficiently to establish within the pocket a flow field for protecting a flame kernel produced by energizing the spark electrodes from extinguishment. The shielding wall further has formed therein at least one opening sized sufficiently to clear the pocket of residual combustion gases in advance of forming an ignition charge within the pocket containing the gaseous fuel and air.

DETAILED DESCRIPTION

Figure 1:
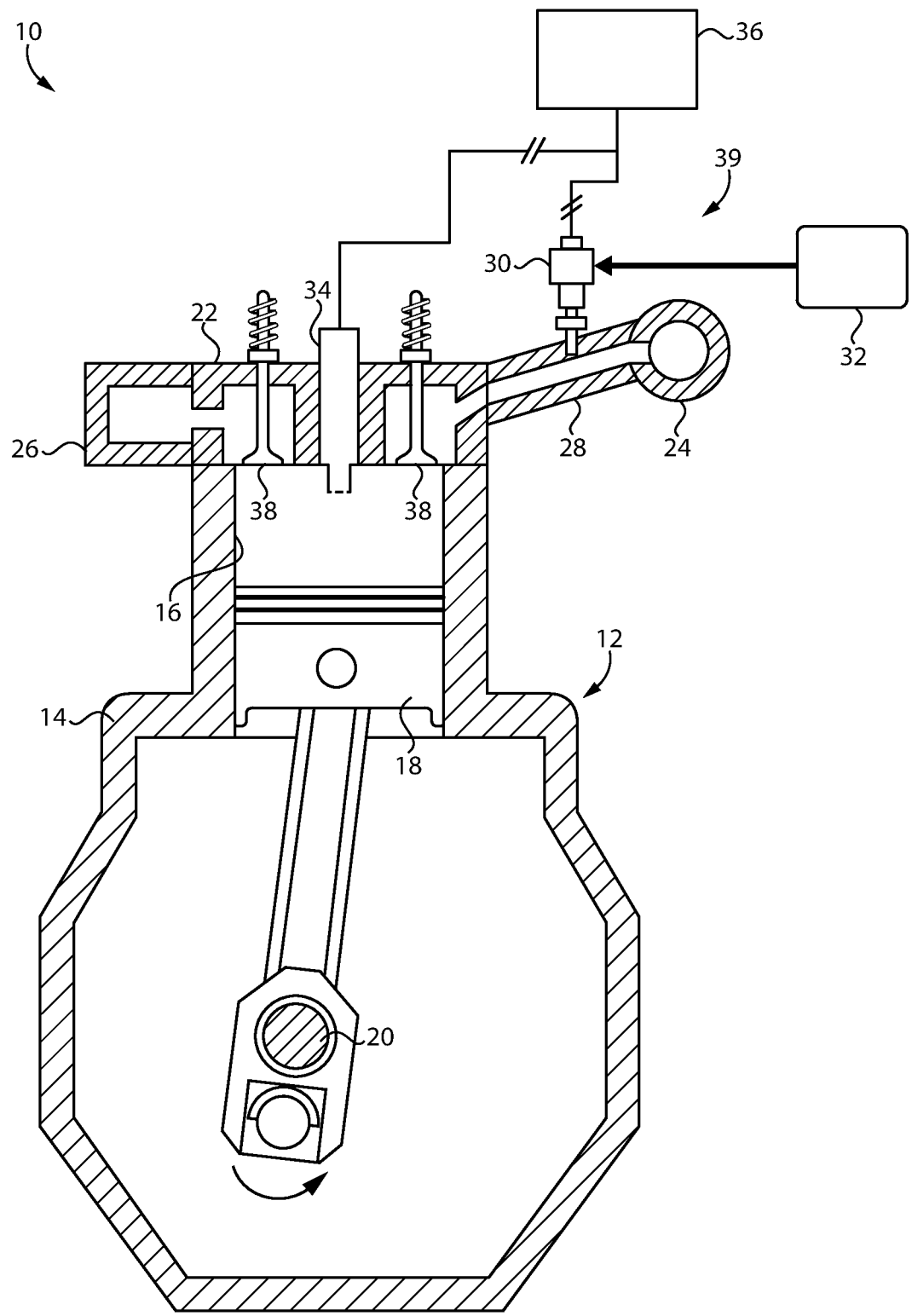
FIG. 1 is a sectioned side diagrammatic view of a gaseous fuel engine system, according to one embodiment.

Referring to FIG. 1, there is shown a gaseous fuel engine system 10, according to one embodiment. Engine system 10 includes an internal combustion engine 12 having an engine housing 14 with a cylinder 16 formed therein. A piston 18 is reciprocable in cylinder 16 between a bottom-dead-center position and a top-dead-center position, typically in a conventional four-stroke pattern. Piston 18 is coupled to a crankshaft 20 and operable to rotate crankshaft 20 for powering a load such as an electrical generator, a pump, a compressor, or a driveline in a vehicle. Cylinder 16 may be one of a plurality of similarly configured and equipped cylinders in engine 12 in any suitable arrangement such as a V-pattern, an in-line pattern, or still another. An engine head 22 is attached to engine housing 14 and supports a plurality of engine valves 38. Engine valves 38 will typically include two intake valves and two exhaust valves for cylinder 16 controlling fluid communication between cylinder 16 and an intake manifold 24 in an intake system 39 and an exhaust manifold 26, respectively. An igniter 34 is also supported in engine head 22, the features and functionality of which are further discussed herein.

Intake system 39 further includes an intake runner 28 extending from intake manifold 24 to engine head 22. A gaseous fuel admission valve 30 is shown coupled to intake runner 28. Engine system 10 also includes a gaseous hydrogen fuel supply 32. A gaseous hydrogen fuel such as molecular hydrogen can be contained in a compressed gaseous state in fuel supply 32, or received as a feed from a reformer, for example. Admission valve 30 may be electrically actuated and is shown electrically connected to an electronic control unit 36 or ECU, which may include a conventional suitably programmed engine control unit. Those skilled in the art will recognize engine system 10 as a port-injected fueling configuration. A gaseous hydrogen fuel, another gaseous fuel such as a gaseous hydrocarbon fuel, or various blends, could additionally or alternatively be conveyed into intake system 39 by way of fumigation, or injected into intake manifold 24, for example.

Figure 2:
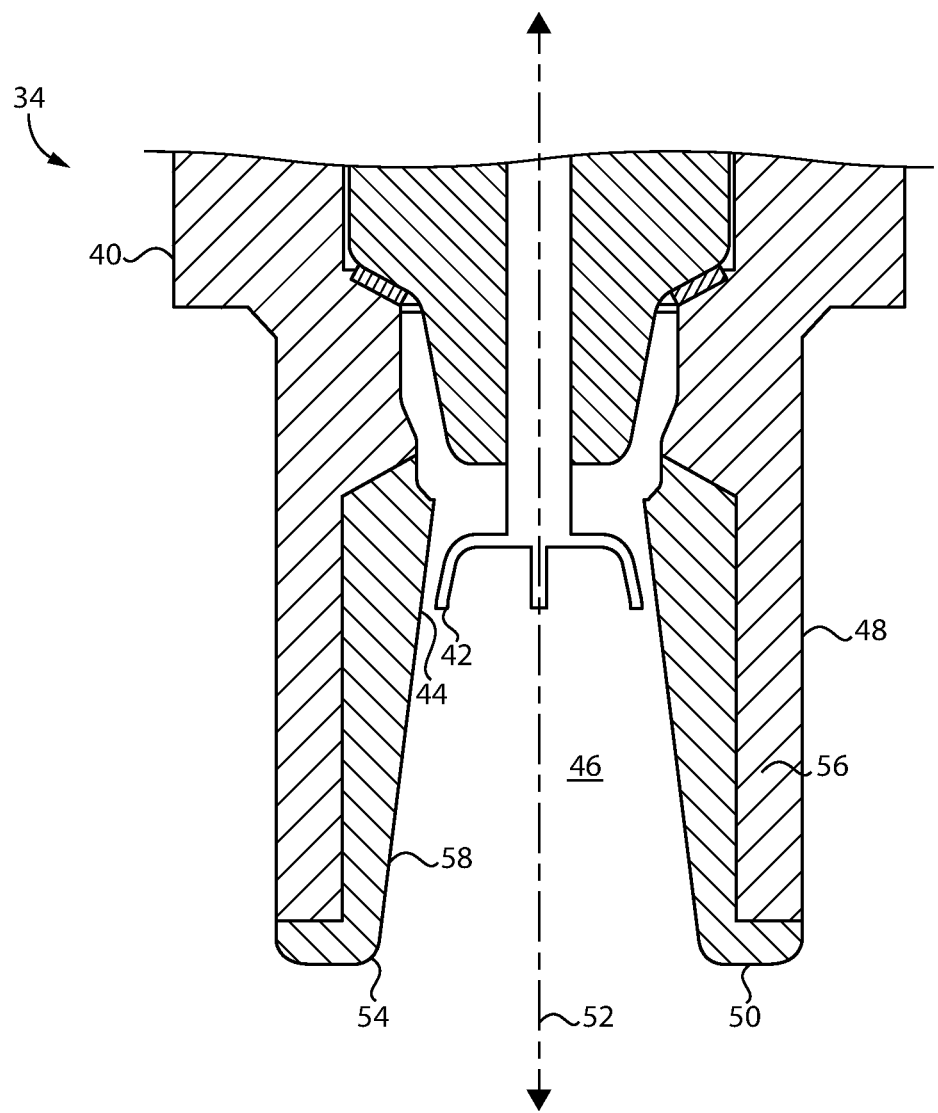
FIG. 2 is a sectioned side diagrammatic view of an igniter, according to one embodiment.

Referring also now to FIG. 2, there are shown features of igniter 34 in further detail. Igniter 34 includes an igniter housing 40 forming a pocket 46 that is fluidly connected to cylinder 16. Igniter 34 may extend into cylinder 16, or could be recessed in engine head 22, such that pocket 46 fluidly connects to cylinder 16 approximately at a location of an exposed fireside surface of engine head 22. Spark electrodes 42 are located in pocket 46 and form a spark gap 44. In the illustrated embodiment spark gap 44 is formed between spark electrodes 42 and igniter housing 40. Igniter 34 is also electrically connected to electronic control unit 36, enabling energizing of spark electrodes 42 at a suitable engine and ignition timing in an engine cycle. The present disclosure is not limited to any particular arrangement or number of spark electrodes or polarity of spark electrodes relative to an igniter housing.

Igniter housing 40 also includes a base section 48 forming a shielding wall 56 extending circumferentially around a center axis 52 and circumferentially around pocket 46. Base section 48 extends in an axial direction to a terminal igniter end or tip 50 forming a cylinder opening 54 that fluidly connects pocket 46 to cylinder 16. Shielding wall 56 shields pocket 46 from cylinder 16 sufficiently to form within pocket 46 a flow field protecting a flame kernel, produced by energizing spark electrodes 42 and formed to ignite an ignition charge, from extinguishment. Pocket 46 is fluidly connected to cylinder 16 sufficiently, however, to clear pocket 46 of residual combustion gases in advance of forming an ignition charge during operating engine system 10 as further discussed herein.

Figure 3:
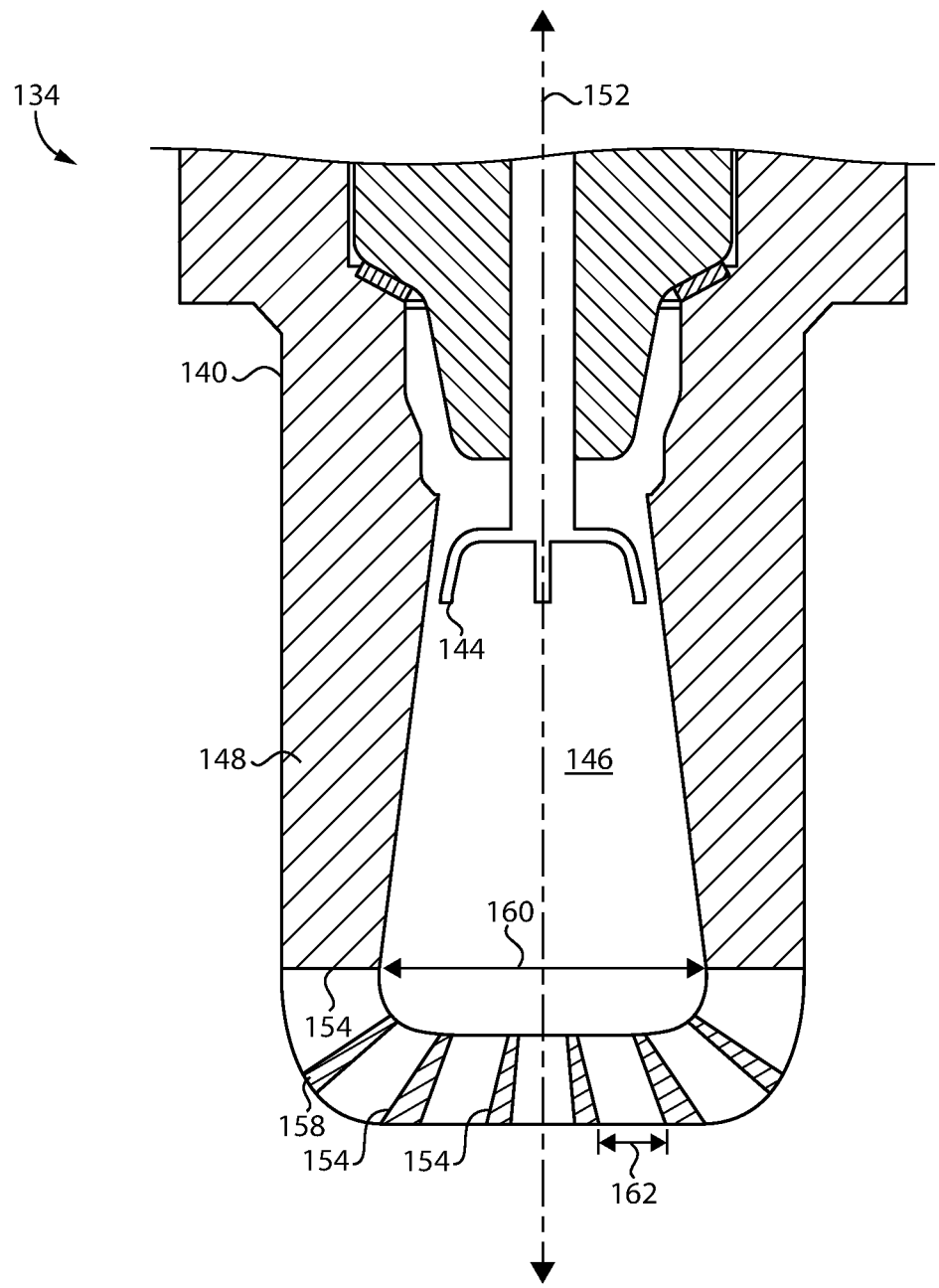
FIG. 3 is a sectioned side diagrammatic view of an igniter, according to another embodiment.

Referring also now to FIG. 3, there is shown an igniter 134 having certain similarities to igniter 34, but certain differences. Igniter 134 includes an igniter housing 140 and a base section 148 that forms a shielding wall extending circumferentially around and shielding a pocket 146 from a cylinder when in service. Spark electrodes 144 are within pocket 146 generally analogous to the embodiment discussed above. Attached to base section 148 is an end section 158 which may have a domed shape or flattened-end shape. Base section 148 extends in a generally axial direction toward end section 158 and may be unperforated. End section 158 may be perforated and includes therein a plurality of openings 154. Openings 154 may form an axially directed flow path between pocket 146 and a cylinder. Generally analogous to igniter 34, igniter 134 may be structured to balance shielding of pocket 146 from a cylinder sufficiently to form within pocket 146 a flow field whilst fluidly connecting pocket 146 to a cylinder sufficiently to clear pocket 146 of residual combustion gases. Pocket 146, and pocket 46 in the preceding embodiment, can be cylindrical, conical, hemispheric, or still another shape.

Also shown in FIG. 3 is a pocket diameter 160. Openings 162 may each have an opening diameter 162. Openings 162 may each have a nominal size greater than 1.6 millimeters, potentially greater than 1.8 millimeters, and in some implementations greater than 2.0 millimeters. The opening size range disclosed will be recognized as larger than openings in certain other ignition devices used in gaseous fuel engines. A total opening area of openings 154, in sum, may be greater than 25% of a cross-sectional area of pocket 146 (a "pocket area") in a plane through a center axis 152 approximately at the location denoted by pocket diameter 160 in FIG. 3. A pocket area may thus be defined in a plane normal to center axis 152 at a location of pocket diameter 160. Put differently, a flow area available for entering and exiting gases through openings 154 may be greater than 25% of a maximum flow area into pocket 146, and in some embodiments may be greater than 50% of that flow area into pocket 146. Different pocket shapes and profiles could have a maximum flow area defined at other locations.

In the embodiment of FIG. 2, pocket 46 may be configured, such that opening 54 has substantially an area that is 100% of a pocket area of pocket 146. Put differently, igniter 34 may be fully open at the location of fluid connection between pocket 46 and cylinder 16 at a terminal end or tip of igniter 34. In igniter 134, while the area of flow communication between a cylinder and pocket 146 may not be completely unobstructed it is contemplated that minimal obstruction to flow rate into or out of igniter 134 will occur. This feature differs from certain known ignition device configurations where substantial throttling of a flow between an ignition prechamber or the like and a cylinder desirably occurs.

INDUSTRIAL APPLICABILITY

As discussed above, igniters according to the present disclosure can be understood to balance shielding of a pocket so as to form a flow field with providing sufficient fluid connection between a pocket and a cylinder so as to clear residual combustion gases. Formation of a flow field herein means that fluid flow within a pocket in an igniter tends to occur substantially independent of the flow of gases within an associated cylinder. Thus, within pocket 46 a spark kernel is not rapidly displaced or disturbed in such a way that it extinguishes prior to initiating combustion of an ignition change. Clearing a pocket of residual combustion gases sufficiently should be understood to mean that all, or virtually all, of the residual combustion gases from a prior ignition event in an igniter are displaced by fresh fuel and air in advance of a subsequent ignition event.

It has been observed in efforts to ignite gaseous hydrogen fuel in a reciprocating engine that a flame kernel formed by an unshielded sparkplug can be readily disturbed and extinguished by a flow of gaseous fuel and air past a spark gap where the flame kernel forms. Ignition problems such as misfire can therefore be observed. At the same time, too much encapsulation or too much shielding of a pocket can limit evacuation of residual combustion gases rendering it difficult or impossible to reliably ignite an ignition charge at a desired, predictable timing, leading in particular to problems with combustion phasing. The present disclosure provides example embodiments of a fully open igniter 34 and a largely open igniter 134 that balance these oft competing factors, providing sufficient protection for a nascent flame kernel while also promoting sufficient evacuation of residual combustion gases.

Figure 4:
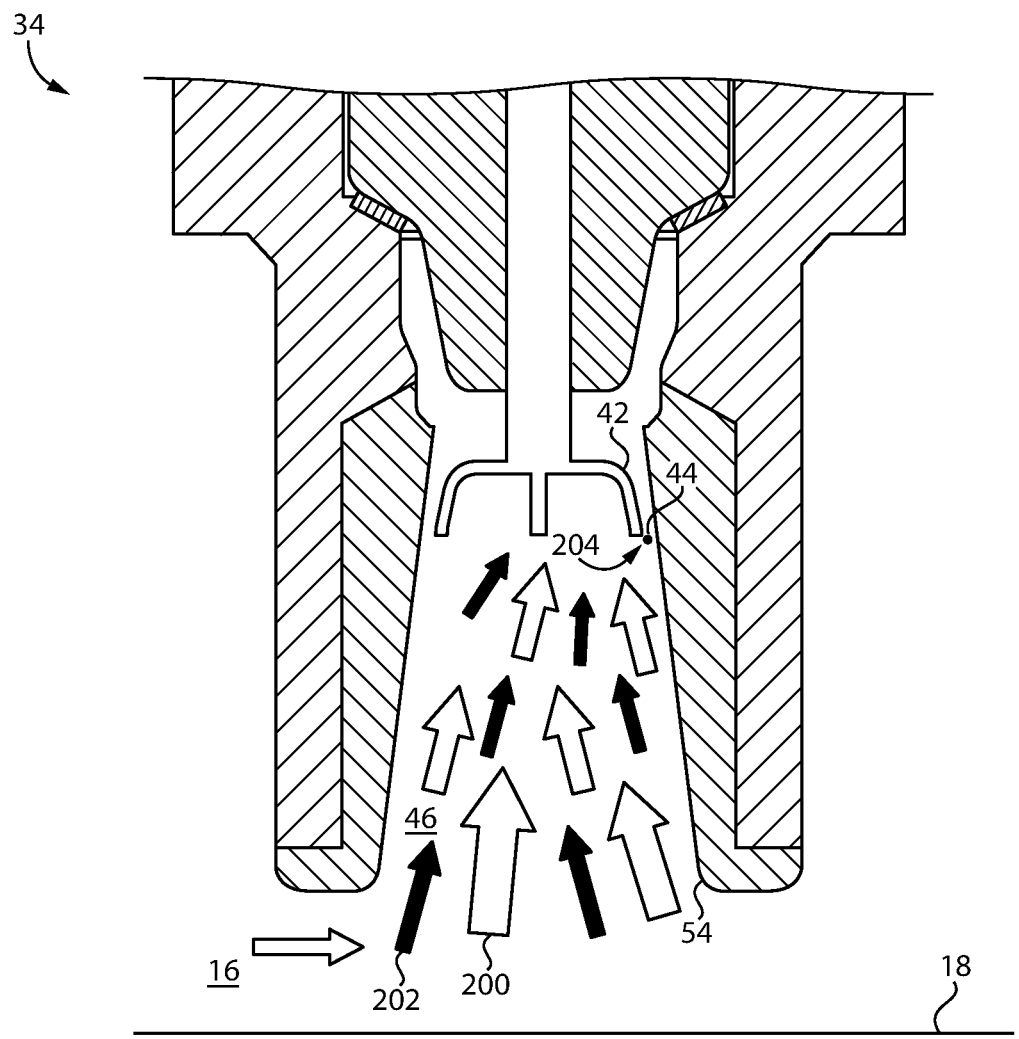
FIG. 4 is a diagrammatic view at one stage of operating a gaseous fuel engine system, according to one embodiment.

Referring now to FIG. 4, there is shown igniter 34 within cylinder 16 as it might appear where piston 18 is reciprocating and is at or close to a top-dead-center position at the end of a compression stroke. Piston 18 has urged a mixture containing a gaseous hydrogen fuel 202 and air 200 from cylinder 16 into pocket 46 in igniter 34 during a compression stroke of piston 18 to form a non-enriched ignition charge within pocket 46. As also depicted in FIG. 4, spark electrodes 42 have been energized to form a flame kernel 204. From the state depicted in FIG. 4 flame kernel 204 proceeds to ignite fuel 202 and air 200.

Figure 5:
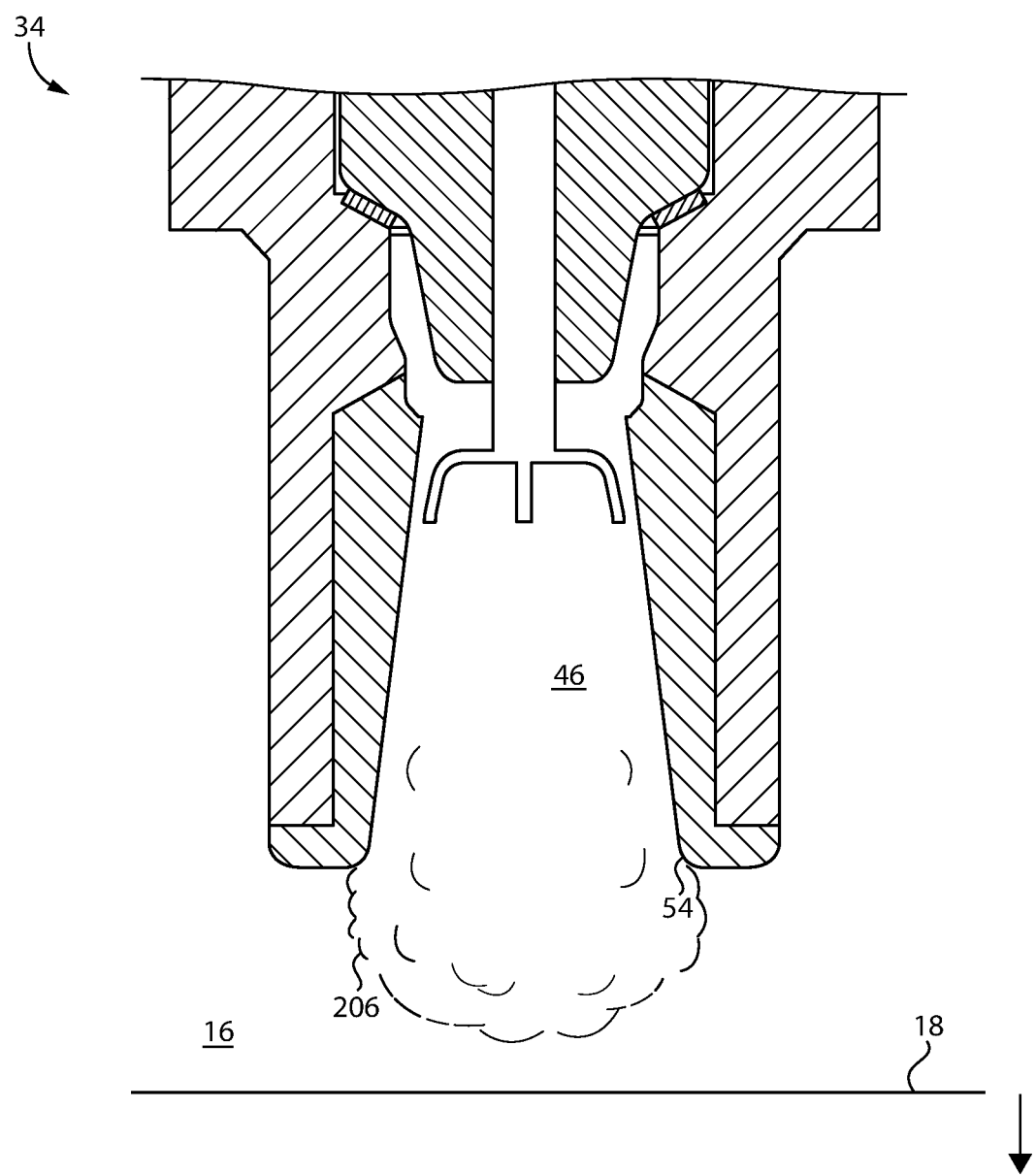
FIG. 5 is a diagrammatic view at another stage of operating a gaseous fuel engine system, according to one embodiment.
Figure 6:
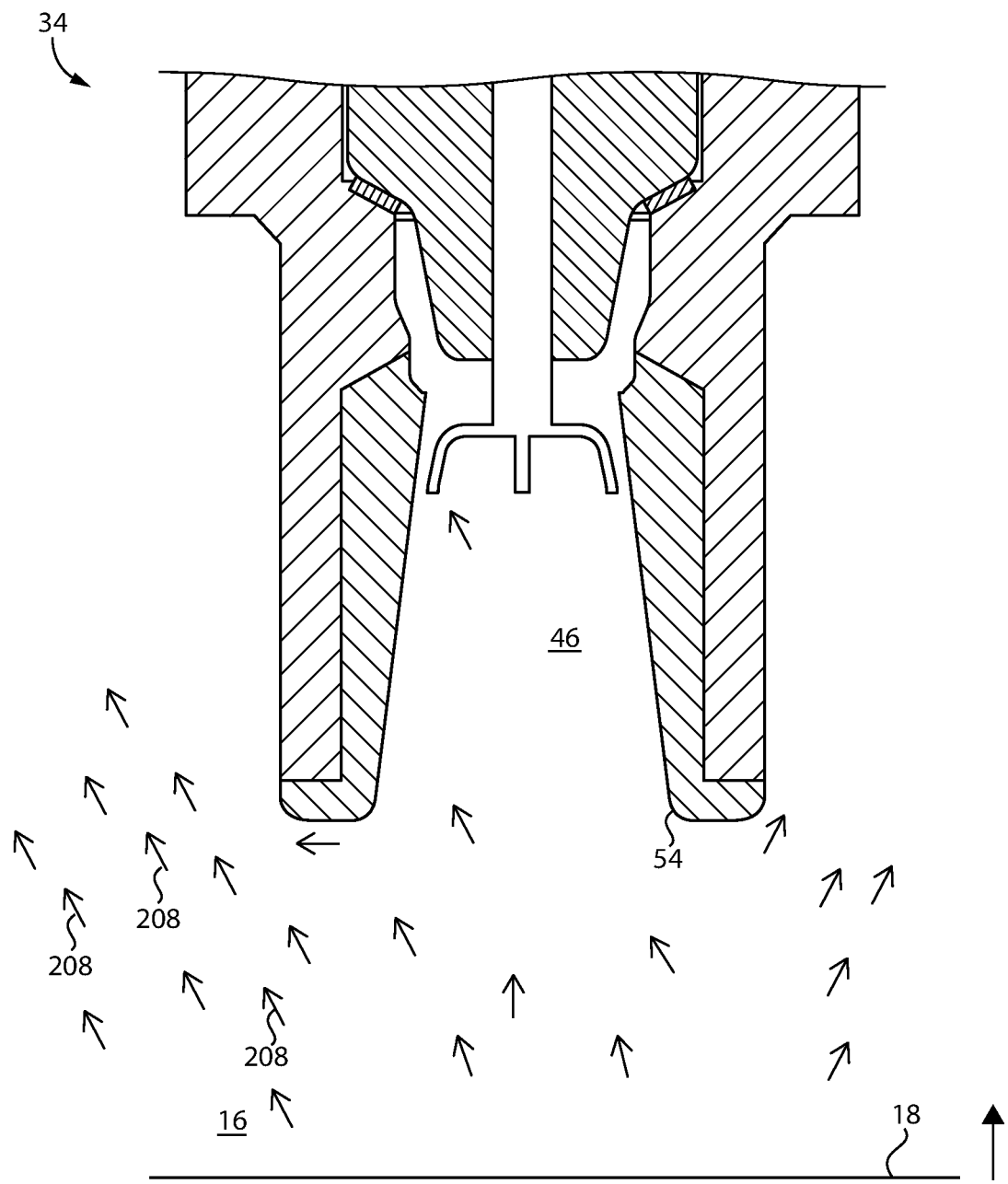
FIG. 6 is a diagrammatic view at yet another stage of operating a gaseous fuel engine system, according to one embodiment.

Turning to FIG. 5, there is shown igniter 34 within cylinder 16 as it might appear where the ignition charge has been ignited via flame kernel 204 and produced a flame jet 206 of the ignition charge from igniter 34 into cylinder 16. Flame jet 206 will ignite a main charge containing gaseous hydrogen fuel and air in cylinder 16 to actuate piston 18 in an expansion stroke. Pocket 46 has been sufficiently shielded to form within pocket 46 a flow field protecting flame kernel 204 from extinguishment. Referring now to FIG. 6, there is shown igniter 34 as it might appear in an exhaust stroke of piston 18 urging residual exhaust gases 208 out of cylinder 16 and generally in a direction of exhaust manifold 26 in engine system 10. The large, and potentially wholly unobstructed opening of pocket 46 to cylinder 16 enables the flow of gases in an exhaust stroke and typically also in a following intake stroke to evacuate all or virtually all of residual exhaust gases 208 from pocket 46. In this way formation of an ignition charge in igniter 34 is stabilized by the shielding of pocket 46 and the exchange of gases between pocket 46 and cylinder 16 such that combustion phasing errors and other undesired phenomena such as misfire in engine system 10 are limited.

In some embodiments, engine system 10 can be operated on pure gaseous molecular hydrogen. In other instances, engine system 10 can be operated on a mixture of molecular hydrogen and another gaseous fuel such as a gaseous hydrocarbon fuel. A substitution ratio of gaseous hydrocarbon fuel may be 10% or greater when operating on a hydrogen/hydrocarbon blend. Using pure hydrogen, the substitution ratio is 100%. During operation the substitution ratio can be varied between 0% hydrogen (pure hydrocarbon gaseous fuel) to 100% hydrogen.

The present description is for illustrative purposes only, and should not be construed to narrow the breadth of the present disclosure in any way. Thus, those skilled in the art will appreciate that various modifications might be made to the presently disclosed embodiments without departing from the kill and fair scope and spirit of the present disclosure.

Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine system comprising:

reciprocating a piston in a cylinder in an engine between a bottom-dead-center position and a top-dead-center position;

urging a mixture containing a gaseous molecular hydrogen fuel and air from the cylinder into a pocket in an igniter during a compression stroke of the piston to form an ignition charge within the pocket;

opening a gaseous fuel admission valve to convey the gaseous molecular hydrogen fuel into the cylinder from a hydrogen fuel supply;

igniting the ignition charge via a flame kernel formed by energizing spark electrodes of the igniter;

igniting a main charge containing the gaseous molecular hydrogen fuel in the cylinder via a flame jet of the ignition charge from the igniter;

shielding the pocket from the cylinder sufficiently to form within the pocket a flow field protecting the flame kernel from extinguishment; and fluidly connecting the pocket to the cylinder sufficiently to clear the pocket of residual combustion gases in advance of the forming of the ignition charge.

2. The method of claim 1 wherein:

the shielding the pocket includes shielding the pocket with a shielding wall of the igniter partially enclosing the pocket; and the fluidly connecting the pocket to the cylinder includes fluidly connecting the pocket via at least one opening in the shielding wall.

3. The method of claim 2 wherein the shielding wall includes an unperforated base section extending circumferentially around a center axis, and a perforated or fully open end.

4. The method of claim 3 wherein the unperforated base section extends circumferentially around the pocket, and the igniter includes a perforated end that forms an axially directed flow path between the pocket and the cylinder.

5. The method of claim 4 wherein a plurality of perforations are formed in the perforated end and each has a nominal size greater than 1.6 millimeters.

6. The method of claim 3 wherein the spark gap is located axially within the unperforated base section.

7. The method of claim 6 wherein the unperforated base section extends axially outward of the spark gap to a terminal tip defining a cylinder opening.

8. The method of claim 7 wherein a pocket area is defined in a plane normal to the center axis and extending through the unperforated base section between the spark gap and the terminal tip, and the cylinder opening has an opening area greater than 25% of the pocket area.

9. The method of claim 8 wherein the opening area is greater than 50% of the pocket area.

10. A method of stabilizing ignition charge formation in a gaseous fuel engine system comprising:

producing a flame kernel within a pocket in an igniter in a gaseous fuel engine via a spark;

shielding the pocket from a flow of gases in a cylinder fluidly connected to the pocket to inhibit extinguishment of the flame kernel;

igniting an ignition charge containing gaseous molecular hydrogen fuel and air within the pocket via the flame kernel;

forming the ignition charge from a mixture of gaseous molecular hydrogen fuel and air conveyed into the pocket and having a substitution ratio of at least 10%;

exchanging gases between the pocket and the cylinder in advance of producing the flame kernel to clear the pocket of residual combustion gases; and limiting combustion phasing errors in the gaseous fuel engine system based on the exchanging gases between the pocket and the cylinder; and opening a gaseous fuel admission valve to convey the gaseous molecular hydrogen fuel for forming the ignition charge into the cylinder from a hydrogen fuel supply.

11. The method of claim 10 wherein the substitution ratio is 100%.

12. The method of claim 10 wherein the ignition charge is non-enriched.

13. The method of claim 10 wherein the shielding the pocket includes forming a flow field within the pocket.

14. The method of claim 10 wherein the exchanging gases between the pocket and the cylinder includes exchanging gases through a total of one opening in the igniter.

15. The method of claim 14 wherein the total of one opening includes an open terminal end of the igniter.

16. A gaseous fuel engine system comprising:

an engine housing having a cylinder formed therein;

a piston reciprocable in the cylinder between a top-dead-center position and a bottom-dead-center position;

a gaseous molecular hydrogen fuel supply;

an intake system connecting between the gaseous molecular hydrogen fuel supply and the cylinder;

an igniter having a pocket formed therein, spark electrodes forming a spark gap within the pocket, and a shielding wall;

the shielding wall extending around the pocket and shielding the pocket from gas flow in the cylinder sufficiently to establish within the pocket a flow field for protecting a flame kernel produced by energizing the spark electrodes from extinguishment; and the shielding wall further having formed therein at least one opening sized sufficiently to clear the pocket of residual combustion gases in advance of forming an ignition charge within the pocket containing the gaseous molecular hydrogen fuel and air.

17. The gaseous fuel engine system of claim 16 wherein the shielding wall includes an unperforated base section extending circumferentially around a center axis, and the spark gap is axially within the unperforated base section.

18. The gaseous fuel engine system of claim 17 wherein the shielding wall includes a fully open terminal end within the cylinder.

19. The gaseous fuel engine system of claim 18 wherein a pocket area is defined in a plane normal to the center axis, and the open terminal end forms an opening area greater than 25% of the pocket area.

* * * * *